Oct. 5, 1926.  
G. A. SWINEFORD ET AL  
1,601,745  
RAKE  
Filed Feb. 14, 1921

Inventor  
George A. Swineford and  
Homer S. Lerch.  
By Fay, Oberlin & Fay  
Attorneys Patented Oct. 5, 1926.

1,601,745

UNITED STATES PATENT OFFICE.

GEORGE A. SWINEFORD AND HOMER S. LERCH, OF CANTON, OHIO, ASSIGNORS, BY MESNE ASSIGNMENTS, TO THE CRONK AND CARRIER MANUFACTURING COMPANY, OF MONTOUR FALLS, NEW YORK, A CORPORATION OF NEW YORK.

RAKE.

Application filed February 14, 1921. Serial No. 444,939.

The present invention relates to rakes of the type commonly called lawn rakes in which there are usual blunt double wire teeth on one side of the head and single curved teeth on the other side, both sets of teeth being so curved as to release the load easily upon forward movement of the rake. More particularly, the present rake embodies a construction in which the lower teeth are rounded or blunted at the points, so as to prevent the cutting or digging into the lawn. These teeth are so formed as to be very much stronger than the ordinary construction and are securely locked in place in the rake head. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1:
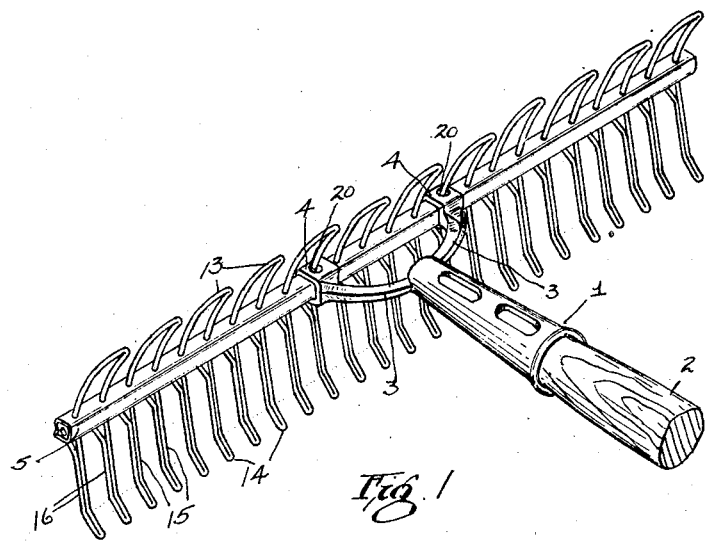
Figure 3:
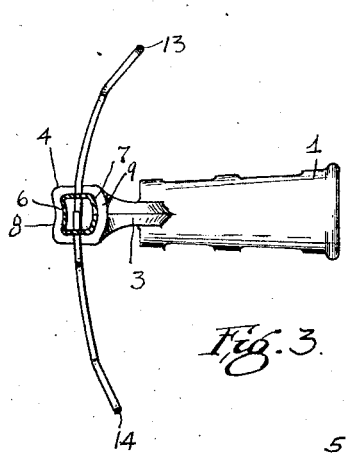
Figure 2:
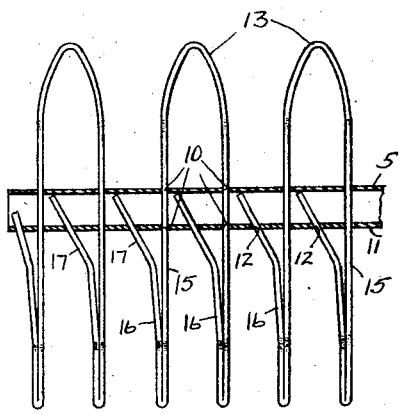
Figure 4:
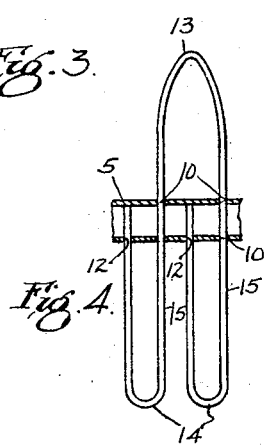

Fig. 1 is a perspective view of my improved rake; Fig. 2 is a section through the rake head showing the teeth in elevation; Fig. 3 is a side elevational view of the socket member but showing the head in section; and Fig. 4 is a broken section similar to Fig. 2 but showing the teeth in place in the head before the forming operation.

In the present lawn rake there is shown a socket 1 adapted to receive the rake handle 2, this socket having two forwardly extending arms 3 provided with apertured ends 4 which are adapted to receive the rake head 5 therein. Preferably this socket and arms are a single malleable casting into which the head is snugly fitted.

The rake head 5 is preferably formed of a single piece of metal bent into a rough rectangular shape but having its forward face 6 slightly concave and its rear face 7 slightly convex, so as to fit the correspondingly shaped sides 8 and 9 of the apertures in the arms of the socket.

The top and bottom sides of the head, taking the position shown in the several figures, are provided with a series of aligned spaced apertures 10 and the bottom face 11 is also provided with a second series of spaced apertures 12 between those of the first series. The teeth of the rake are preferably formed of wire and each length of wire used forms one of the broad upper teeth 13 and two of the narrow lower teeth 14. The upper teeth 13 are of the usual staple shape, the wire extending vertically through the apertures 10 and being rounded at the top to form a blunt tooth. The whole tooth is curved backwardly as best shown in Figs. 1 and 3 so as to release the load easily upon reverse movement of the rake.

The lower teeth 14 are formed by extending the wires 15 through the lower apertures 10 and then rebending such wires backwardly and through the second series of spaced apertures 12 until the teeth take the form shown in Fig. 4. In this form it is seen that the re-bent portions 16 of the lower teeth extend upwardly into the head at substantially a right angle similar to the downwardly extending portions 15 of the teeth. When the teeth have thus been placed in the rake head, the lower teeth are formed by bending the rebent portion 16 against the vertically downward extending portion 15 over a major portion of their length and thus the teeth are given the form and shape shown in Fig. 2. This forms a double tooth with the two portions fitting closely adjacent each other over the major portion of their length, but having the upper end 17 of the free ends set at an angle so that they tend to lock themselves in the second series of apertures 12 in the rake head. The rebent ends 16 extend to the top of the rake head and are thus locked in position against the same to stiffen the device.

By using these double rebent lower teeth, the strength of the rake is materially increased without adding excess weight, and rounded or blunt points are obtained which do not tend to dig or cut into the lawn and which are very much easier to release from the material which is being raked. It will also be seen that the socket piece has apertures 20 in the arms through which the teeth extend so that the teeth maintain the socket in position and thus make an integral, solid structure which is not liable to loosen or break in use. After the rake has been formed and the teeth have been given their final form, the entire rake including teeth, head and socket, is tin plated or galvanized, thus helping to secure, and in a sense, solder the teeth in position in the head to make a rigid satisfactory structure.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:—

1. A lawn rake comprising a head having spaced pairs of apertures in one side, and a series of spaced holes in the opposite side aligned with one of the apertures of each pair, and teeth carried by said head in said pairs of apertures and said holes, each tooth being formed of wire closely rebent upon itself, one leg of each tooth passing through one aperture of a pair and through the hole aligned with said aperture, the other leg thereof being angularly bent adjacent the head to enter the other aperture of the pair.

2. A lawn rake comprising a head of substantially rectangular hollow section and having spaced pairs of apertures in one side, and a series of spaced holes in the opposite side aligned with one of the apertures of each pair, and teeth carried by said head in said pairs of apertures and said holes, each tooth being formed of wire closely rebent upon itself, one leg of each tooth passing through one aperture of a pair and through the hole aligned with said aperture, the other leg thereof being angularly bent adjacent the head to enter the other aperture of the pair.

Signed by us, this 7th day of February, 1921.

GEORGE A. SWINEFORD.
HOMER S. LERCH.